United States Patent [19]

Ballast

[11] Patent Number: 5,431,378
[45] Date of Patent: Jul. 11, 1995

[54] SELF-RETAINING COMPRESSION DIE SPRING RETAINER

[75] Inventor: Rodney G. Ballast, Wyoming, Mich.

[73] Assignee: Sharp Design, Inc., Wyoming, Mich.

[21] Appl. No.: 108,904

[22] Filed: Aug. 18, 1993

[51] Int. Cl.$^6$ ............................................. F16F 1/06
[52] U.S. Cl. .................................. 267/179; 267/289
[58] Field of Search ................ 267/28, 29, 170, 286, 267/287, 249, 159, 160, 163, 130, 179, 177; 403/314, 309, 300; 24/103, 711.4

[56] References Cited

U.S. PATENT DOCUMENTS

| | | | |
|---|---|---|---|
| 1,031,317 | 7/1912 | Barbour, Jr. | 24/711.4 |
| 2,561,405 | 7/1951 | O'Brien et al. | 267/159 |
| 4,288,064 | 9/1981 | Austen | 267/159 |
| 4,521,005 | 6/1985 | Calderoni | 267/179 |
| 4,529,179 | 7/1985 | Seyler | 207/287 |
| 4,543,988 | 10/1985 | Haveteau | 267/177 X |
| 4,807,859 | 2/1989 | Bolthouse | 267/179 |
| 4,881,725 | 11/1989 | Shioda et al. | 267/179 |

OTHER PUBLICATIONS

Product brochure entitled "The BMC Spring Retainer" published by The BMC Spring Retainer, Traverse City, Mich., publication date unknown.
Descriptive literature entitled "Die Design Standards" published by General Motors Corporation in the United States, Jun., 1987, Of specific interest is paragraph 43.02 entitled "Spring Retainers".
Descriptive literature entitled "Die Design Standards", published by General Motors Corporation in the United States, Jun., 1987. Of specific interest is paragraph 61.04 entitled "Spring Retainers".
Product descriptive literature entitled "Danly Spring Retainers" published by Danly Corporation in the United States, publication data unknown.

*Primary Examiner*—Robert J. Oberleitner
*Assistant Examiner*—Lee W. Young
*Attorney, Agent, or Firm*—Price, Heneveld, Cooper, DeWitt & Litton

[57] ABSTRACT

A method and an article for assembling a compression die spring in a spring pocket formed in a die member includes a retainer having an outer edge that is larger in width than the diameter of the sidewall of the spring pocket in order to form an interference fit with the sidewall and, thereby, retains a spring, a portion of which is spanned by the member in the spring pocket. The retainer has four legs whose distal ends are on a circle whose diameter is larger than the diameter of the pocket sidewall. At least two of the legs are configured to straddle a turn of the spring to allow the retainer to be juxtaposed with the spring with all four legs extending outwardly from the spring to engage the pocket sidewall. In one embodiment, the outer edge of the retainer is turned in order to accommodate variations in diameter of the pocket sidewall.

12 Claims, 3 Drawing Sheets

SELF-RETAINING COMPRESSION DIE SPRING RETAINER

BACKGROUND OF THE INVENTION

This invention relates generally to mechanical fasteners and, more particularly, to retainer's for fastening compression die springs in their respective spring pockets. The invention may be utilized with compression die springs of any spring stock cross section configuration.

In Tool & Die assemblies, compression springs are used to either provide holding pressure while forming the part or stripping the part from the trim or form punch. The compression spring is positioned in a cylindrical opening drilled in a die, known as a "spring pocket." The spring applies a bias to a member called a "pad" or "stripper." When such pad or stripper is removed from an upper die member, the compression springs will drop out of the spring pockets under the influence of gravity unless retained in the pockets by retainers.

Various forms of spring retainers have been proposed to retain the compression springs in the spring pockets of the upper die member when the pad or stripper is removed. Prior art die spring retainers typically utilize a socket head cap screw, or a shoulder screw, to hold a retainer and, thus, the compression spring in place. This requires drilling and tapping of a tack hole in the bottom of the spring pocket and a relatively complex maneuver in order to assemble the spring, retainer and fastener into the spring pocket and provides a retention force greatly in excess of that required. While such prior art spring retainers are effective, they add significant cost to the die assembly.

In order to retain a compression spring in the spring pocket of an upper die member, it is necessary only to provide a retention force that equals the weight of the spring plus an engineering safety factor. Because even heavy-duty and extra heavy-duty compression die springs weigh on the order of magnitude of a pound, the force required to retain a die spring in a spring pocket is not great.

SUMMARY OF THE INVENTION

The present invention provides a method and apparatus for retaining a die spring in a die member spring pocket utilizing a retainer that is both inexpensive to manufacture and easy to apply when installing the die spring. A die spring retainer and method of installing a die spring according to the invention provides adequate retention force to retain the die spring in the spring pocket of an upper die member. Importantly, the necessity for drilling and tapping a tack hole at the bottom of the spring pocket is eliminated.

The present invention is for use with a die assembly having a cylindrical hole known as a "spring pocket" formed in a die member and a die spring, which is defined by a plurality of turns of spring stock, in the spring pocket. The invention is embodied in a retainer for retaining the spring in the spring pocket having a member spanning a portion of the spring and including an outer edge that is larger in width than the pocket sidewall diameter. This creates an interference fit with the sidewall of the pocket, in which the retainer is inserted, in order to retain the spring in the pocket.

A method of assembling a die spring in a spring pocket formed in a die member according to the invention includes providing a retainer having a member with an outer edge that is larger in width than the sidewall diameter of the pocket; juxtaposing the retainer with the die spring in a manner that the retainer spans a portion of the die spring; and inserting the spring and the juxtaposed retainer into the pocket. This forms an interference fit between the retainer outer edge and the pocket sidewall and, thereby, retains the spring in the pocket.

The retainer may include a body defining at least four legs whose distal edges are on a circle whose diameter is larger than the pocket sidewall diameter. Two of the legs may be configured to span a turn of the spring with a stop included between these two legs in order to abut the inner surface of the spring turn and, thereby, locate the retainer positively with respect to the spring. While the retainer is, preferably, a substantially planar member, it may be desirable to include a turned portion adjacent an outer edge of the retainer in order to accommodate variations in the diameter of the pocket sidewall. It may additionally be desirable to define two stop members, each between an opposite pair of legs. In this manner, the retainer may be made symmetrical and, thereby, insertable between the spring turns in either direction.

These and other objects, advantages and features of this invention will become apparent upon review of the following specification in conjunction with the drawings.

DESCRIPTION OF THE PREFERRED EMBODIMENT

Figure 1:
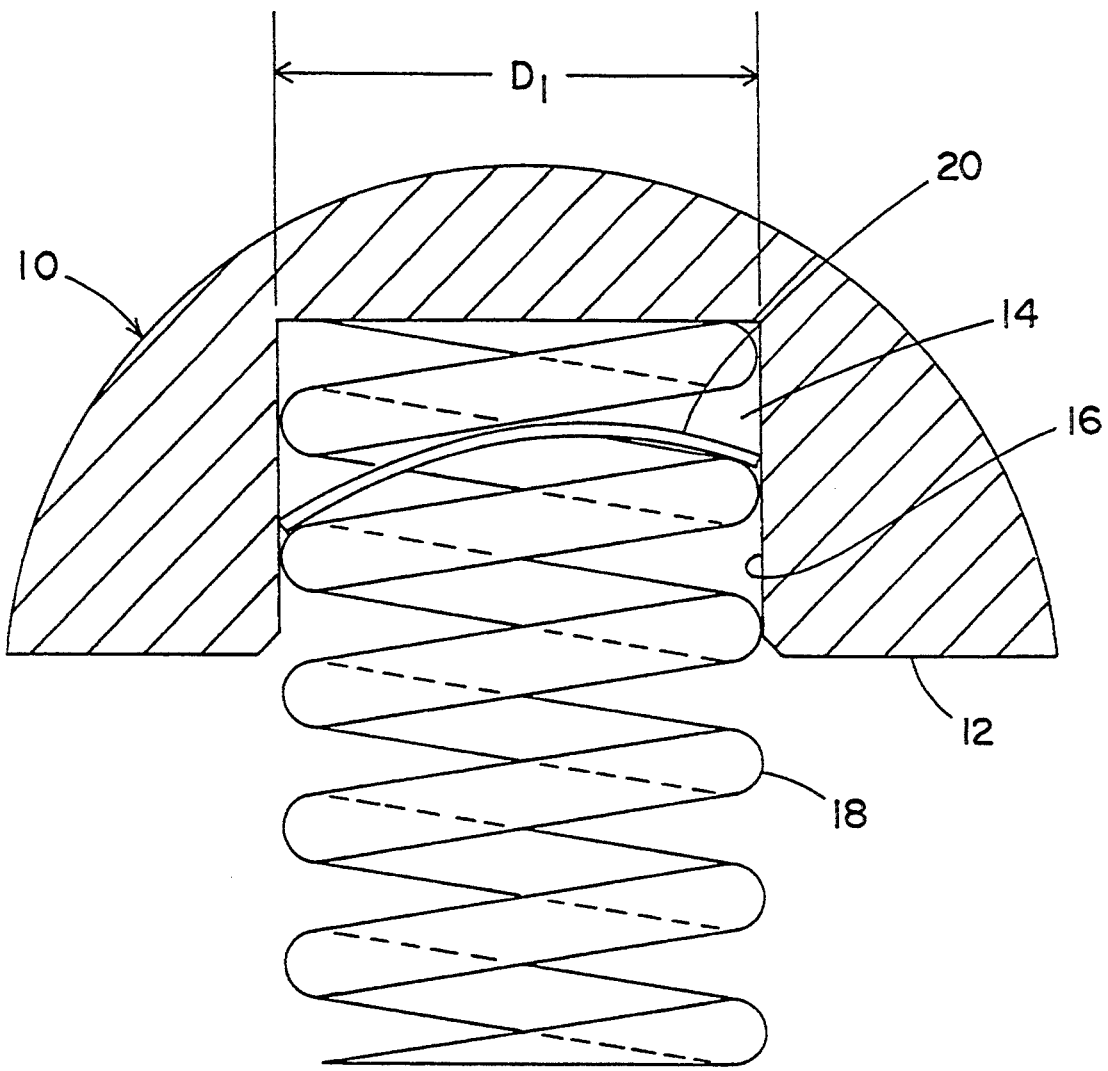
FIG. 1 is a side elevation of a die assembly and method of assembling a die spring in a die pocket according to the invention.

Referring now specifically to the drawings, and the illustrative embodiments depicted therein, a die assembly, generally indicated at 10, includes an upper die member 12, which is drilled with a cylindrical hole 14 having a sidewall 16 defining a spring pocket in die member 12 (FIG. 1). Cylindrical wall 16 has a diameter $D_1$ to accept a compression die spring 18 of a slightly smaller diameter. Die spring 18 is retained in die pocket 14 by a die spring retainer 20. Die spring 18 may be a conventional chrome vanadium compression steel die spring of medium, heavy or extra-heavy pressure, made of spring stock having a flattened circular cross section or may be made of spring stock having other cross-sectional configurations such as square or round.

Figure 2:
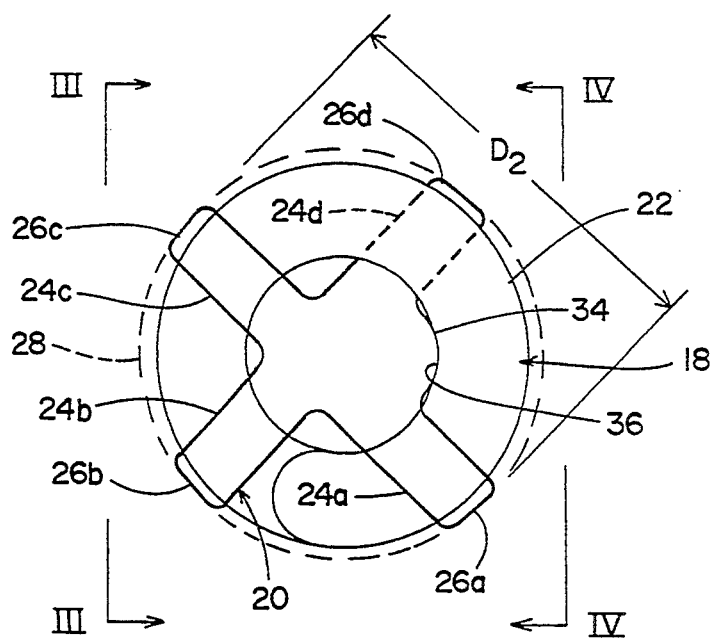
FIG. 2 is a top plan view of a spring retainer according to the invention juxtaposed with a die spring.
Figures 3, 4:
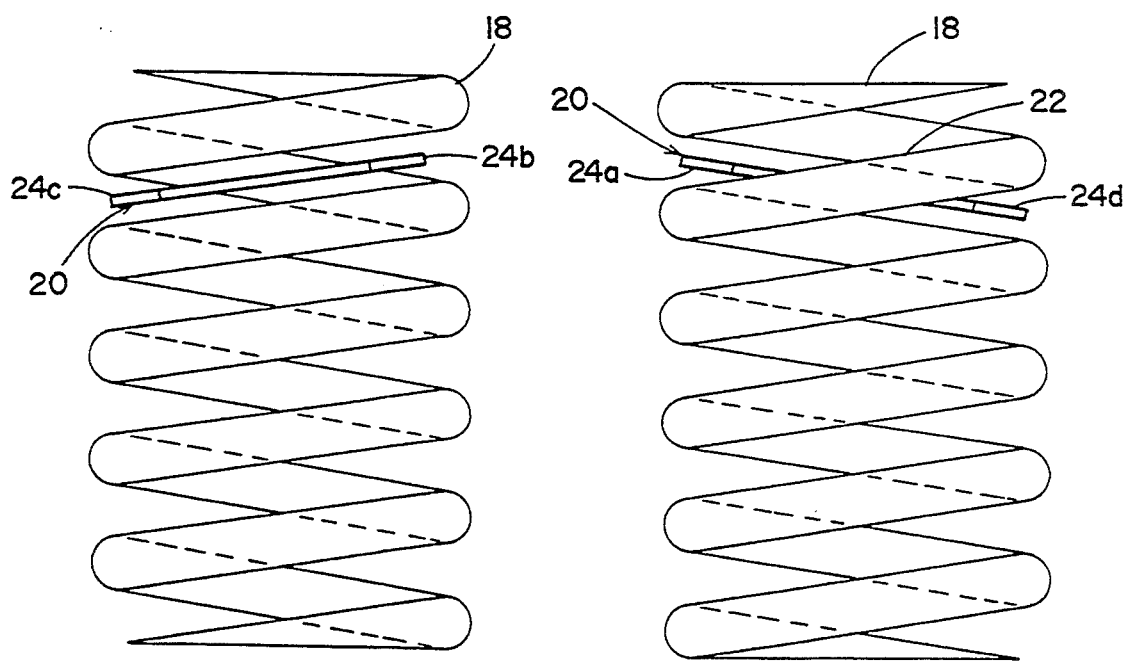
FIG. 3 is a side elevation in the direction III—III in FIG. 2.
FIG. 4 is a side elevation in the direction IV—IV in FIG. 2.

Die spring retainer 20 is a generally planar member having a width $D_2$ that is slightly larger than diameter $D_1$ of spring pocket 14 (FIG. 2). Retainer 20 is configured, as will be set forth in more detail below, in a manner that allows it to span a single turn 22 of spring 18. With retainer 20 spanning turn 22 of spring 18, and with spring 18 and retainer 20 inserted into spring pocket 14, retainer 20 forms an interference fit with cylindrical wall 16. This results in a slight buckling of retainer 20, which is exaggerated in FIG. 1. Importantly, the interference fit between retainer 20 and cylindrical wall 16 produces a sufficient retention force to support the weight of spring 18 and, thereby, retain spring 18 in spring pocket 14.

Figure 5:
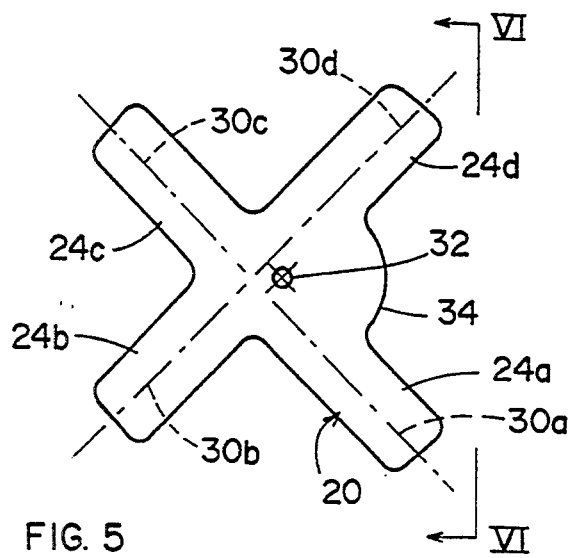
FIG. 5 is a top plan view of a first embodiment of a die spring retainer according to the invention.
Figure 6:
FIG. 6 is a side elevation in the direction VI—VI in FIG. 5.

In the illustrated embodiment, die spring retainer 20 is defined by four legs 24a, 24b, 24c and 24d (FIGS. 2-5). Legs 24a-24d include perimeter edges 26a, 26b, 26c and 26d, respectively, which lie on a circle 28 having diameter $D_2$. Legs 24a-24d are symmetrically elongated along axes 30a, 30b, 30c and 30d, respectively (FIG. 5). Axes 30a-30d pass to the left of center 32 of circle 38 as viewed in FIG. 5. This offset arrangement is for the purpose of allowing legs 24a and 24d to straddle turn 22 of spring 18, while allowing retainer 20 to be substantially planar, as illustrated in FIG. 6. A curved protrusion between legs 24a and 24d defines a stop 34, which abuts the inner surface 36 of turn 22. This stop indexes retainer 20 properly with respect to spring 18, with circle 28 defined by perimeter edges 26a-26d being generally concentric spring 18. This concentric arrangement allows insertion of spring 18 and retainer 20 into spring pocket 14.

Figure 7:
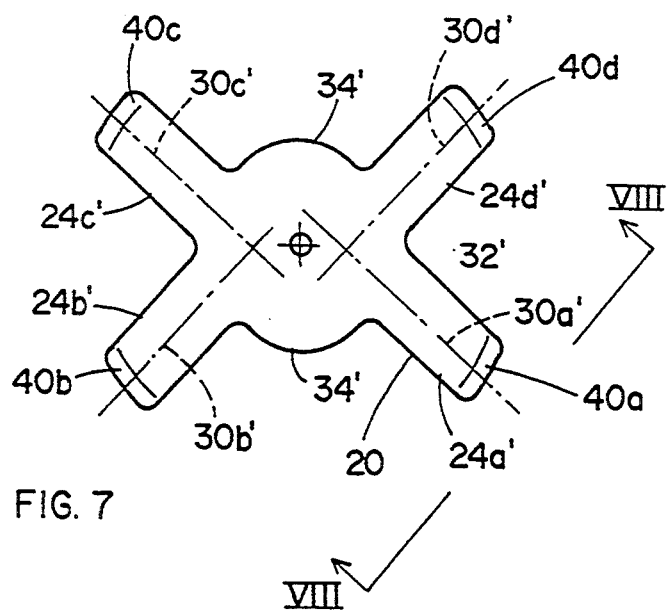
FIG. 7 is a top plan view of a second embodiment of a die spring retainer according to the invention.
Figure 8:
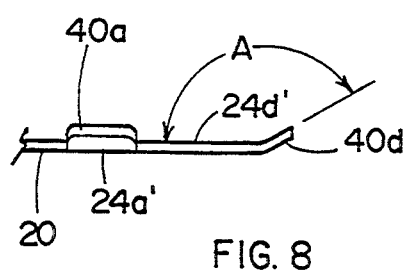
FIG. 8 is a side elevation in the direction VIII—VIII in FIG. 7.

While the above-described arrangement is satisfactory for spring pockets 14 formed with precision equipment, whereby cylindrical wall 16 has a small-tolerance diameter $D_1$, not all spring pockets 14 are formed with such precision machining equipment. In particular, small machine shops may lack automated drill bit sharpening equipment and will thus sharpen drill bits by hand. Such hand-sharpened drill bits lack the ability to make a small tolerance hole. As a result, a spring pocket 14 formed with such hand-sharpened drill bit may have a wider tolerance in its sidewall diameter $D_1$. In order to accommodate such wider tolerance in sidewall diameter, a die spring retainer 20' is provided, which includes a turned portion 40a, 40b, 40c and 40d at the distal end of legs 24a', 24b', 24c' and 24d', respectively (FIGS. 7 and 8). Each turned portion 40a-40d is formed by bending the distal ends of legs 24a'-24d' out of the plane of retainer 20' by an angle A. In the illustrated embodiment, angle A is 150°. This allows the width of retainer 20' to compress more substantially than that of retainer 20 when forming the interference fit with spring pocket 14 in order to accommodate a greater variance in diameter $D_1$ of spring pocket 14. Spring retainer 20' is also different from retainer 20 in that it is symmetrical about both major axes and includes a pair of stops 34' between opposite pairs of legs. With such configuration, retainer 20' may be juxtaposed with spring 18 with either stop 34' engaged with inner surface 36 of spring turn 22. This makes the application of the spring retainer more intuitive in that it does not matter from which direction the spring retainer is inserted into the spring. Although spring retainer 20' is bent out of plane at turned portions 40a-40d, it has a generally planar configuration as illustrated in FIG. 8.

Spring retainer 20 in the illustrated embodiment is manufactured from mild steel such as type 1008 or 1010 low carbon steel. Spring retainer 20' is manufactured from pre-tempered spring steel. In the illustrated embodiment, retainer 20 has a nominal thickness of 0.040 inches and retainer 20' has a nominal thickness of 0.035 inches.

The use of four legs to produce an interference fit advantageously ensures that such interference fit will occur even if retainer 20, 20' is canted with respect to spring pocket 14. Irrespective of the orientation of retainer 20, 20' in spring pocket 14, the minimum width of the spring retainer that interfaces with cylindrical wall 16 will be $D_2$. This further allows the invention to be utilized with a wider range of spring turn thicknesses by allowing the angle of the retainer to be non-critical with respect to the sidewall of the spring pocket. The retainer will have one orientation for a heavy-duty spring and a different orientation for a medium-duty spring. However, the retention force will be sufficient to retain spring 18 notwithstanding variations in the orientation of the spring retainer. It is known to utilize spring cages to surround compression die springs in order to retain pieces of a broken spring from escaping into other portions of the die set. The invention may be utilized with such spring cages by enlarging the width of the spring retainer to accommodate the larger diameter of the spring pocket required for such spring cages.

It is seen that the present invention not only eliminates the labor, equipment and expense of drilling and tapping a tack hole in each spring pocket, but eliminates the necessity for any specialized tools in order to assemble a die spring in a die pocket according to the method aspects of the present invention. Thus, a significant savings is realized not only in the reduction in the cost of the spring retainer but in the tools necessary to install the spring in the die member. The clearly significant reduction in labor time to prepare the die member and to install the die spring will additionally result in substantial cost savings.

Changes and modifications in the specifically described embodiments can be carried out without departing from the principles of the invention. For example, the space between any two legs, except those straddling the spring turn, could be filled-in to join the legs into a continuous arcuate portion having radially spaced leg segments. The protection afforded the invention is intended to be limited only by the scope of the appended claims, as interpreted according to the principles of patent law including the Doctrine of Equivalents.

The embodiments of the invention in which an exclusive property or privilege is claimed are defined as follows:

1. In a die assembly having a cylindrical hole formed in a die defining a pocket having a cylindrical sidewall of predetermined diameter, a die spring defined by a plurality of turns of spring stock in said pocket, and a retainer for retaining said spring in said spring pocket, said retainer comprising:

a retaining member that is substantially planar prior to insertion into said pocket, said retaining member defining at least four legs having distal edges on a circle with two of said legs configured to straddle at least one spring turn and including a stop between said two of said legs that is configured to abut the inner surface of the spring turn straddled by said two of said legs, and wherein said circle having a diameter that is larger than the pocket sidewall diameter prior to insertion of said retaining member into said spring pocket such that said retaining member is compressed when inserted in said pocket thus creating an interference fit with the pocket sidewall.

2. The retainer in claim 1 wherein said legs each extend along an axis and at least one said axis does not intersect the center of said circle.

3. The retainer in claim 2 wherein none of said axes intersect said center.

4. The retainer in claim 1 wherein each of said legs is turned at a distal portion adjacent its distal edge in order to accommodate variations in pocket sidewall diameter.

5. The retainer in claim 1 including another stop between the other two of said legs, whereby said retainer is capable of application to a spring in either of two orientations.

6. In a die assembly having a cylindrical hole formed in a die defining a pocket having a cylindrical sidewall of predetermined diameter, a die spring defined by a plurality of turns of spring stock in said pocket, and a retainer for retaining said spring in said spring pocket, said retainer comprising:

a retaining member that is substantially planar prior to insertion into said pocket, said retaining member defining at least four legs having distal edges on a circle with each of said legs positioned substantially entirely between two adjacent spring turns, and wherein said circle having a diameter that is larger than the pocket sidewall diameter prior to insertion of said retaining member into said spring pocket such that said retaining member is compressed when inserted in said pocket thus creating an interference fit with the pocket sidewall.

7. The retainer in claim 6 wherein two of said legs straddle at least one spring turn.

8. The retainer in claim 7 including a stop between said two of said legs which stops against at least on spring turn.

9. The retainer in claim 8 including another stop between the other two of said legs, whereby said retainer is capable of application to a spring in either of two orientations.

10. The retainer in claim 6 wherein said legs each extend along an axis and at least one said axis does not intersect the center of said circle.

11. The retainer in claim 10 wherein none of said axes intersect said center.

12. The retainer in claim 6 wherein each of said legs in turned at a distal portion adjacent its distal edge in order to accommodate variations in pocket sidewall diameter.

* * * * *

UNITED STATES PATENT AND TRADEMARK OFFICE
CERTIFICATE OF CORRECTION

PATENT NO. : 5,431,378
DATED : July 11, 1995
INVENTOR(S) : Rodney G. Ballast

It is certified that error appears in the above-indentified patent and that said Letters Patent is hereby corrected as shown below:

Column 1, line 7;
"retainer's" should be --retainers--.

Column 6, line 9, Claim 8;
After "against" insert --said-- and "on" should be --one--.

Column 6, line 21, Claim 12;
"in turned" should be --is turned--.

Signed and Sealed this

Seventeenth Day of October, 1995

Attest:

BRUCE LEHMAN

*Attesting Officer*    Commissioner of Patents and Trademarks